United States Patent
Kang et al.

(10) Patent No.: US 10,833,763 B2
(45) Date of Patent: Nov. 10, 2020

(54) BI-DIRECTIONAL WIRELESS OPTICAL COMMUNICATION APPARATUS AND METHOD THEREOF

(71) Applicant: ELECTRONICS AND TELECOMMUNICATIONS RESEARCH INSTITUTE, Daejeon (KR)

(72) Inventors: Hyun Seo Kang, Gwangju (KR); Chan Il Yeo, Gwangju (KR); Young Soon Heo, Gwangju (KR); Kye Eun Kim, Naju-si (KR); Sung Chang Kim, Gwangju (KR); Ji Hyoung Ryu, Jeonju-si (KR); Si Woong Park, Gwangju (KR); Keo Sik Kim, Gwangju (KR); Gi Hyeon Min, Gwangju (KR); Hyoung Jun Park, Gwangju (KR); Dong Hoon Son, Gwangju (KR); Mun Seob Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/699,964

(22) Filed: Dec. 2, 2019

(65) Prior Publication Data
US 2020/0186247 A1  Jun. 11, 2020

(30) Foreign Application Priority Data
Dec. 11, 2018  (KR) ......................... 10-2018-0159188

(51) Int. Cl.
*H04B 10/00* (2013.01)
*H04B 10/112* (2013.01)
(Continued)

(52) U.S. Cl.
CPC ......... *H04B 10/1125* (2013.01); *H04B 10/40* (2013.01); *H04J 14/02* (2013.01)

(58) Field of Classification Search
CPC ... H04B 10/11; H04B 10/112; H04B 10/1121; H04B 10/1123; H04B 10/1125; H04B 10/1129
See application file for complete search history.

(56) References Cited

U.S. PATENT DOCUMENTS 7,587,141 B2  9/2009  Fisher et al.
8,577,223 B2  11/2013  von der Weid et al.
(Continued)

FOREIGN PATENT DOCUMENTS

KR  10-2002-0056827 A  7/2002
KR  10-2008-0065251 A  7/2008

*Primary Examiner* — Daniel G Dobson
(74) *Attorney, Agent, or Firm* — LRK Patent Law Firm

(57) ABSTRACT

A wireless optical communication apparatus for performing bi-directional optical transmission in a free space includes a first optical system configured to transmit data through a downlink scheme and a second optical system configured to receive the data from the first optical system and transmit a control signal to the first optical system through an uplink scheme, wherein each of the first optical system and the second optical system transmits and receives the data and the control signal through a single port.

16 Claims, 6 Drawing Sheets

(51) Int. Cl.
*H04B 10/40* (2013.01)
*H04J 14/00* (2006.01)
*H04J 14/02* (2006.01)

(56) References Cited

U.S. PATENT DOCUMENTS

| | | |
|---|---|---|
| 9,042,734 B2 | 5/2015 | Makowski et al. |
| 9,236,942 B1 | 1/2016 | Roberds et al. |
| 2004/0151504 A1* | 8/2004 | Triebes .............. H04B 10/1125 398/131 |
| 2013/0202309 A1 | 8/2013 | Park et al. |
| 2014/0153928 A1 | 6/2014 | Yu et al. |
| 2016/0204861 A1* | 7/2016 | Boroson ................. H04J 14/02 398/96 |
| 2018/0088280 A1* | 3/2018 | Kim ................... G02B 6/29361 |

* cited by examiner

BI-DIRECTIONAL WIRELESS OPTICAL COMMUNICATION APPARATUS AND METHOD THEREOF

CROSS-REFERENCE TO RELATED APPLICATION

This application claims priority to and the benefit of Korean Patent Application No. 10-2018-0159188, filed on Dec. 11, 2018, the disclosure of which is incorporated herein by reference in its entirety.

BACKGROUND

1. Field of the Invention

The present invention relates to a wireless optical communication apparatus capable of performing bi-directional optical transmission in a free space and a method thereof.

2. Description of Related Art

In order to perform wireless optical transmission and optical reception in a free space using light, various structures and a large number of optical components are used.

Conventionally, in the transmitting of light in a free space, a wireless optical communication system is constituted using a port for transmission and a port for reception which are different. In this case, since optical transmission and optical reception are performed through separated ports in a free space, an optical system for transmission and an optical system for reception need to be separately provided. In addition, it is a hassle to optically align the optical system for transmission and the optical system for reception.

In order to perform wireless optical communication with a mobile object moving in a free space, for example, wireless optical communication with a mobile object moving in real time, such as a drone, there is a need to maintain optical alignment. To this end, an additional tracking function is needed, and in order to perform the tracking function, an optical system for tracking is separately required.

As described above, the conventional optical system used for wireless optical communication in a free space requires separated optical transmission and reception units for data transmission and tracking, which increases the manufacturing cost and causes a hassle in performing optical alignment on the respective transmission and reception units.

SUMMARY OF THE INVENTION

The present invention is directed to providing a bi-directional wireless optical communication apparatus and a bi-directional wireless optical communication method thereof, capable of performing optical transmission and optical reception in bi-directional data transmission through a single port using a wireless light beam at a time of communication with a mobile object moving in a free space, and also performing a tracking function required for optical alignment with a mobile object through the same optical path The technical objectives of the present invention are not limited to the above, and other objectives may become apparent to those of ordinary skill in the art based on the following descriptions.

The present invention is directed to providing a wireless optical communication apparatus for performing bi-directional optical transmission in a free space, the wireless optical communication apparatus including a first optical system configured to transmit data through a downlink scheme and a second optical system configured to receive the data from the first optical system and transmit a control signal to the first optical system through an uplink scheme, wherein each of the first optical system and the second optical system transmits and receives the data and the control signal through a single port.

The present invention is directed to providing a bi-directional wireless optical communication method using a wireless optical communication apparatus in a free space, the bi-directional wireless optical communication method including transmitting, by a first optical system, a first optical signal including data and a tracking optical signal for optical alignment through a downlink scheme, or transmitting, by a second optical system, a second optical signal including a control signal and a tracking optical signal for optical alignment through an uplink scheme and receiving, by the first optical system, the second optical signal through the uplink scheme or receiving, by the second optical system, the first optical signal through the downlink scheme, wherein each of the first optical system and the second optical system transmits and receives the first optical signal and the second optical signal through a single port, and the first optical system is attached to a mobile object and transmits and receives the data and the control signal over a free space, and the second optical system is disposed on a ground station.

DETAILED DESCRIPTION OF EXEMPLARY EMBODIMENTS

Figure 1:
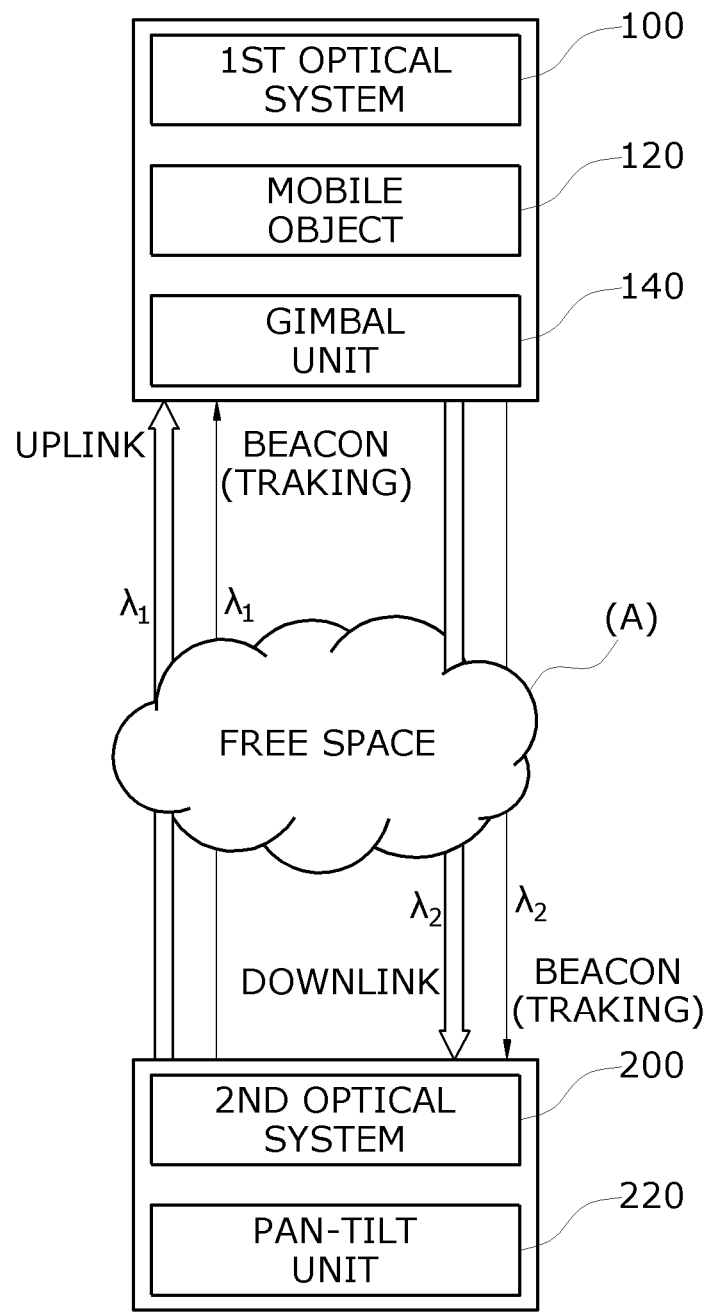
FIG. 1 is a view for describing a wireless optical communication apparatus according to an embodiment of the present invention.

Hereinafter, embodiments of the present invention will be described in detail with reference to the accompanying drawings so that those skilled in the art may easily carry out the present invention. The present invention may be embodied in various ways and is not to be construed as limited to the embodiments set forth herein. In the drawings, parts irrelevant to the description have been omitted for the clarity of explanation.

The term "comprise," "include," "comprising," and/or "including" means that one or more other components, steps, and operations and/or the existence or addition of elements may be included in addition to the described components, steps, operation, and/or elements unless context dictates otherwise.

The present invention relates to a bi-directional wireless optical communication apparatus 1 and a bi-directional wireless optical communication method thereof.

Recently, various services may be provided using a mobile object moving in a free space. Accordingly, an amount of data is also gradually growing, and a need for wireless optical communication using light capable of providing a transmission speed in Gbps or higher arises.

According to an embodiment of the present invention, in order to perform real-time wireless optical communication with a mobile object 120 moving in a free space A, such as a drone, optical transmission and optical reception of data are bi-directionally performed through a single port and, at the same time, a tracking optical signal is transmitted through the single port.

Hereinafter, the wireless optical communication apparatus 1 for performing bi-directional optical transmission in a free space A according to the embodiment of the present invention will be described with reference to FIGS. 1 to 4.

FIG. 1 is a view for describing the wireless optical communication apparatus 1 according to the embodiment of the present invention.

The wireless optical communication apparatus 1 according to the embodiment of the present invention includes a first optical system 100 and a second optical system 200.

The first optical system 100 is attached to a moving object 120 to transmit data using light and receive a control signal while the moving object 120 is moving in a free space A. The first optical system 100 transmits the data to the second optical system 200 through a downlink scheme and receives the control signal from the second optical system 200 through an uplink scheme.

The mobile object 120 to which the first optical system 100 is attached may correspond to a drone, an ad balloon, or the like.

The second optical system 200 is attached to a ground station to receive data from the first optical system 100 and transmit a control signal using light to the first optical system 100. The second optical system 200 receives the data from the first optical system 100 through a downlink scheme and transmits the control signal to the first optical system 100 through an uplink scheme.

In this case, the embodiment of the present invention is characterized in that each of the first optical system 100 and the second optical system 200 transmits and receives the data and the control signal through a single port.

In addition, the embodiment of the present invention allows a tracking optical signal required for optical alignment to be transmitted together with the data and the control signal and thus to be shared between the first optical system 100 attached to the mobile object 120 moving in the free space A and the second optical system 200 disposed on the ground station such that the optical transmission and the optical reception are continuously maintained between the first optical system 100 and the second optical system 200.

The tracking allows the same optical path to be continuously used such that error-free transmission is maintained in the wireless optical communication between the first optical system 100 attached to the mobile object 120 in motion and the second optical system 200 disposed on the ground station.

In this case, the first optical system 100 and the second optical system 200 may transmit and receive the tracking optical signal between each other through the same port used for the transmission and reception of the data and the control signal. That is, the first optical system 100 may transmit a tracking optical signal for optical alignment together with the data in the form of an optical signal through the downlink scheme, and the second optical system 200 may transmit a tracking optical signal for optical alignment together with the control signal through the uplink scheme.

With such a structure, the embodiment of the present invention obviates the need to provide an additional optical system for tracking.

According to the embodiment of the present invention, the first optical system 100 and the second optical system 200 may implement a bi-directional tracking function between each other using a beacon beam as a tracking optical signal.

Figure 2:
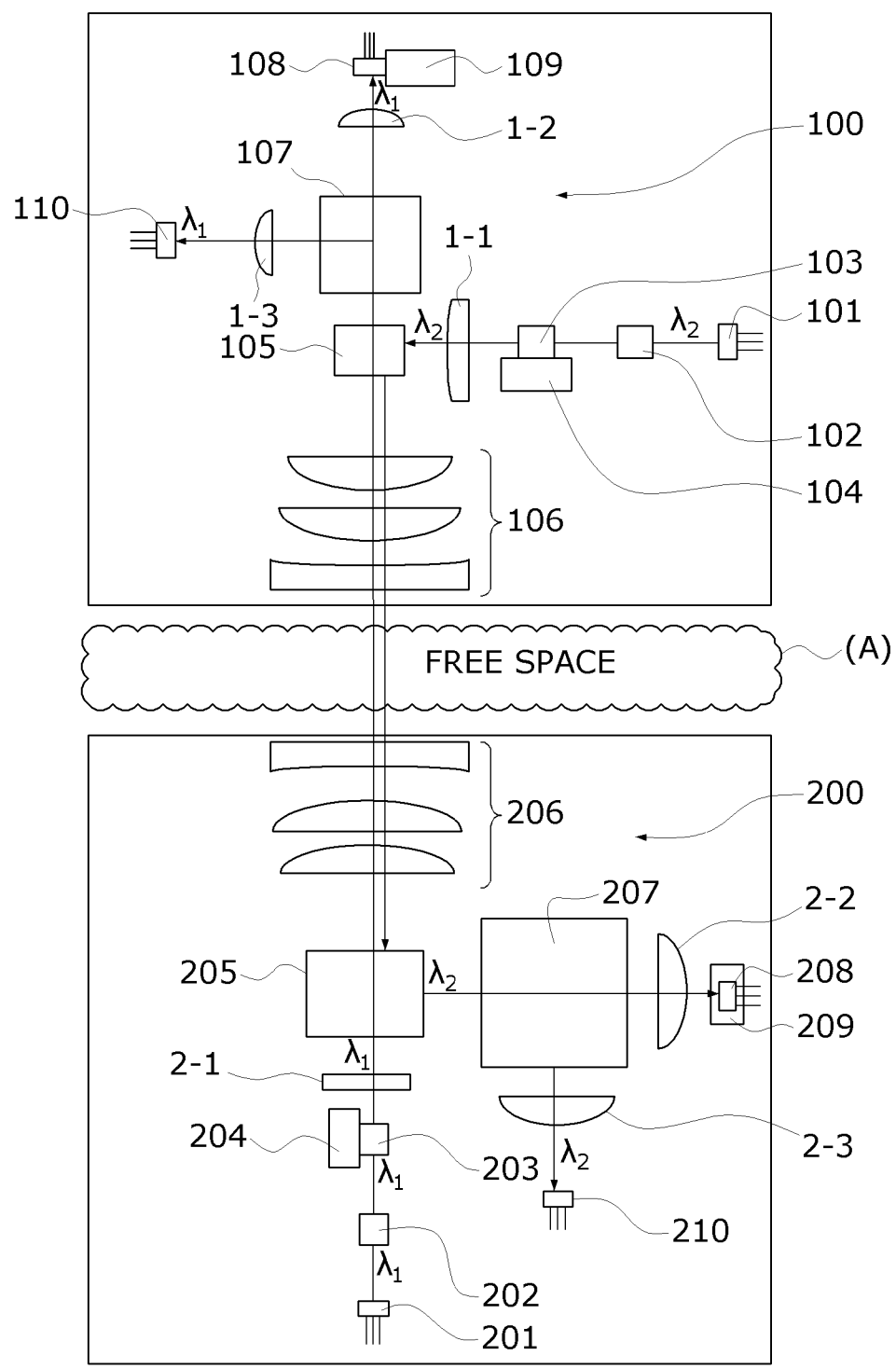
FIG. 2 is a view for describing a first optical system and a second optical system.

FIG. 2 is a view for describing the first optical system 100 and the second optical system 200.

First, the uplink optical transmission process from the second optical system 200 disposed on the ground station to the first optical system 100 attached to the mobile object 120 in motion will be described.

Here, a configuration of the first optical system 100 for transmitting an optical signal through a downlink scheme is referred to as a configuration of a downlink optical transmitting unit 101, and a configuration of the second optical system 200 for receiving an optical signal through a downlink scheme is referred to as a configuration of a downlink optical receiving unit 208.

Similarly, a configuration of the second optical system 200 for transmitting an optical signal through an uplink scheme is referred to as a configuration of an uplink optical transmitting unit 201, and a configuration of the first optical system 100 for receiving an optical signal through an uplink scheme is referred to as a configuration of an uplink optical receiving unit 108.

In the second optical system 200 disposed on the ground station, the uplink optical transmitting unit 201 converts a control signal and a tracking optical signal into an optical signal $\lambda 1$ and provides the optical signal $\lambda 1$ to an optical fiber, and the optical signal $\lambda 1$ is amplified in an optical amplifier 202 and then the amplified optical signal is output from a subsequent optical fiber.

In this case, the second optical system 200 according to the embodiment of the present invention includes a first uplink stage 204 to which an optical connector 203 connected to an optical fiber for transferring the optical signal $\lambda 1$ output through the uplink optical transmitting unit 201 is attached and which is configured to adjust a travelling distance of a beam to a lens 2-1 by moving in at least one direction of an X-axis, a Y-axis, and a Z-axis, that is, in a direction of X-axis, Y-axis, Z-axis, XY-axes, YZ-axes, or XZ-axes.

The optical signal $\lambda 1$ passing through the lens 2-1 is output through a wavelength division multiplexing (WDM) filter 205 and a transmission/reception lens 206 of the second optical system 200 to the free space A.

In order for the optical signal $\lambda 1$ output to the free space A to be diverged or collimated such that the wireless optical communication with the first optical system 100 attached to the mobile object 120 in motion is continuously maintained, the second optical system 200 adjusts a shape of the beam with the travelling distance of the optical signal to the lens 2-1 using the first uplink stage 204.

The optical signal $\lambda 1$ output to the free space A is focused by a transmission/reception lens 106 of the first optical system 100 and then sequentially passes through a WDM filter 105 and a beam splitter 107 which splits optical power, thereby being divided into two optical signals.

One of the optical signals is an optical signal for a control signal, which is focused through a lens 1-2 and is input to the uplink optical receiving unit 108 and thus is photoelectric-converted into the control signal.

In this case, the first optical system 100 may include a second uplink stage 109 to which the uplink optical receiving unit 108 is attached and which is configured to adjust a reception position of the optical signal by moving in at least one direction of an X-axis, a Y-axis, and a Z-axis. Since the uplink optical receiving unit 108 is attached to the second uplink stage 109, the reception position of the optical signal may be adjusted such that the optical signal is input with the optimum optical power.

According to the embodiment of the present invention, such an XYZ stage is attached to optimize the optical path to thereby remove the limitation in the chromatic aberration correction and alignment so that the optical transmission efficiency may be enhanced.

Another one of the optical signals passing through the beam splitter 107 is an optical signal for tracking, which is focused through a lens 1-3 and is input to a first tracking-purpose optical signal receiving unit 110, through which the optical signal is photoelectric-converted to perform tracking processing.

Next, the downlink optical transmission process from the first optical system 100 attached to the mobile object in motion to the second optical system 200 disposed on the ground station will be described.

In the first optical system 100 attached to the mobile object (120) in motion, the downlink optical transmitting unit 101 converts the data and the tracking optical signal into an optical signal $\lambda 2$ and inputs the optical signal $\lambda 2$ into an optical fiber, and the optical signal $\lambda 2$ is amplified in an optical amplifier 102 and then output as an amplified optical signal to a subsequent optical fiber.

In this case, the first optical system 100 according to the embodiment of the present invention includes a first downlink stage 104 to which an optical connector 103 connected to an output end of an optical fiber for transferring the optical signal $\lambda 2$ output through the downlink optical transmitting unit 101 is attached and which is configured to adjust a travelling distance of a beam to a lens 1-1 by moving in at least one direction of an X-axis, a Y-axis, and a Z-axis.

The optical signal $\lambda 2$ passing through the lens 1-1 is provided through the WDM filter 105 and the transmission/reception lens 106 of the first optical system 100 to the free space A.

In order for the optical signal $\lambda 2$ output to the free space A to be diverged or collimated such that the wireless optical communication with the second optical system 200 disposed on the ground station is continuously maintained, the first optical system 100 adjusts a shape of the beam with the travelling distance of the optical signal to the lens 1-1 using the first downlink stage 104.

The optical signal $\lambda 2$ output to the free space A is focused by the transmission/reception lens 206 of the second optical system 200 disposed on the ground station and then sequentially passes through the WDM filter 205 and a beam splitter 207 which splits optical power, thereby being divided into two optical signals.

One of the optical signals is an optical signal for data, which is focused through a lens 2-2 and is input to the downlink optical receiving unit 208 and thus is photoelectric-converted into data.

In this case, the second optical system 200 may include a second downlink stage 209 to which the downlink optical receiving unit 208 is attached and which is configured to adjust a reception position of the optical signal by moving in at least one direction of an X-axis, a Y-axis, and a Z-axis.

Since the downlink optical receiving unit 208 is attached to the second downlink stage 209, the reception position of the optical signal may be adjusted such that the optical signal is input with the optimum optical power.

Another one of the optical signals passing through the beam splitter 207 is an optical signal for tracking, which is focused through a lens 2-3 and input to a second tracking-purpose optical signal receiving unit 210, through which the optical signal is photoelectric-converted to perform tracking processing.

Meanwhile, according to the embodiment of the present invention, in order to adjust the size of an optical beam between the WDM filter 105 and the transmission/reception lens 106 of the first optical system 100 attached to the mobile object 120, the number of the transmission/reception lens 106 may, as needed, be increased or decreased. In addition, the lens 1-1, the lens 1-2, and the lens 1-3 may, as needed, be omitted or added.

Similarly to the first optical system 100, in order to adjust the size of an optical beam between the WDM filter 205 and the transmission/reception lens 206 of the second optical system 200 disposed on the ground station, the number of the transmission/reception lens 206 may, as needed, be increased or decreased. In addition, the lens 2-1, the lens 2-2, and the lens 2-3 may, as needed, be omitted or added.

In this case, all the lenses used for the first optical system 100 and the second optical system 200 may be implemented using various types of lenses such as a concave lens, a convex lens, a cylindrical lens, etc.

According to the embodiment of the present invention, a mirror (not shown) may be added in front of the transmission/reception lens 106 or 206 of the first optical system 100 or the second optical system 200 to change the travelling direction of the beam so that the path of the beam may be variously changed when in use.

According to the embodiment of the present invention, optical devices constituting the first and second tracking-purpose optical signal receiving units 110 and 210 provided in the first and second optical systems 100 and 200 may be implemented using a quad photodiode (QPD), a position photodiode, and the like. In addition, the optical alignment may be achieved using only one of the first tracking-purpose optical signal receiving unit 110 and the second tracking-purpose optical signal receiving unit 210 as needed rather than using both.

Hereinafter, additional configurations provided for optical alignment of the first and second optical systems 100 and 200 will be described with reference to FIGS. 3 and 4.

Figure 3:
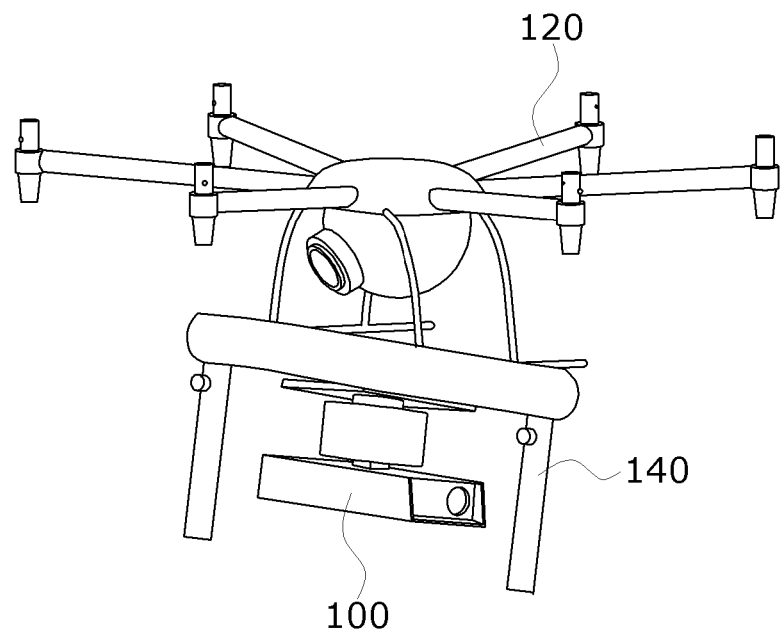
FIG. 3 is an exemplary diagram illustrating a gimbal unit attached to the first optical system.

FIG. 3 is an exemplary diagram illustrating a gimbal unit 140 attached to the first optical system 100.

The first optical system 100 is attached to the gimbal unit 140 of the mobile object 120 such that optical alignment with the second optical system 200 in the free space A is continuously maintained through at least one of a panning operation and a tilt operation.

In detail, the optical alignment using the gimbal unit 140 may be performed as follows.

First, when the second tracking-purpose optical signal receiving unit 210 of the second optical system 200 fails to detect the tracking optical signal transmitted by the first optical system 100 or when the tracking optical signal is positioned away from a central portion of the second tracking-purpose optical signal receiving unit 210 due to the beam path being misaligned even to a small degree, the second optical system 200 transmits a notification message to the first optical system 100 such that the first optical system 100 performs at least one of a panning operation and a tilt operation through the gimbal unit 140.

Second, when the first tracking-purpose optical signal receiving unit 110 of the first optical system 100 fails to detect the tracking optical signal transmitted by the second optical system 200 or when the tracking optical signal is positioned away from a central portion of the first tracking-purpose optical signal receiving unit 110 due to the beam path being misaligned even to a small degree, the first optical system 100 performs at least one of a panning operation and a tilt operation through the gimbal unit 140 such that the first tracking-purpose optical signal receiving unit 110 is aligned.

When the alignment is maintained as such, wireless optical transmission between the downlink optical receiving unit 208 and the uplink optical receiving unit 108 may be maintained without error.

Figure 4:
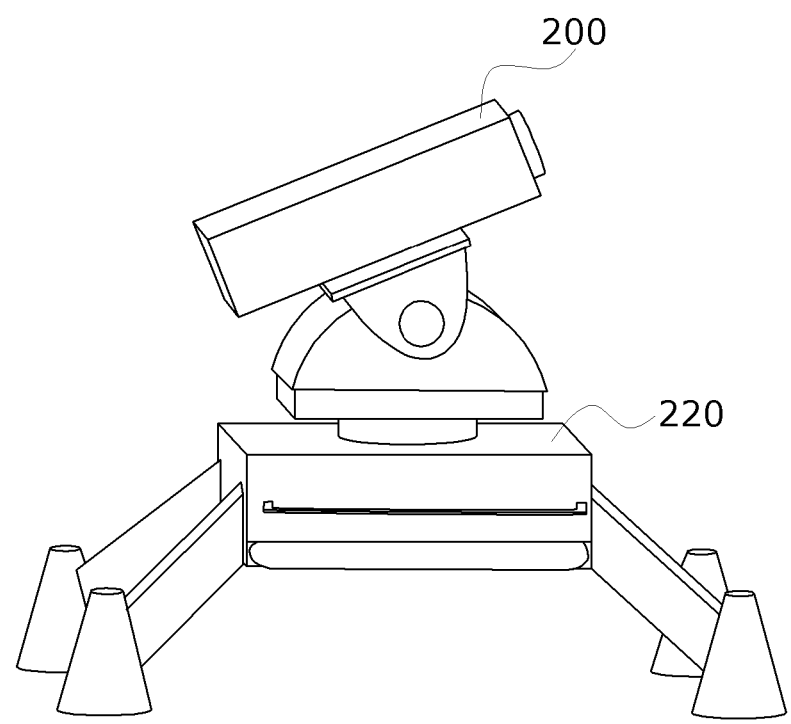
FIG. 4 is an exemplary diagram illustrating a pan-tilt unit attached to the second optical system.

FIG. 4 is an exemplary diagram illustrating a pan-tilt unit 220 attached to the second optical system 200.

The second optical system 200 is attached to the pan-tilt unit 220 such that optical alignment with the first optical system 100 in the free space A is continuously maintained through at least one of a panning operation and a tilt operation.

In detail, the optical alignment using the pan-tilt unit 220 is performed as follows.

First, when the first tracking-purpose optical signal receiving unit 110 of the first optical system 100 attached to the mobile object 120 in motion fails to detect the tracking optical signal transmitted by the second optical system 200 or when the tracking optical signal is positioned away from a central portion of the first tracking-purpose optical signal receiving unit 110 due to the beam path being misaligned even to a small degree, the first optical system 100 transmits a notification message to the second optical system 200 so that the second optical system 200 performs at least one of a panning operation and a tilt operation through the pan-tilt unit 220.

Second, when the second tracking-purpose optical signal receiving unit 210 of the second optical system 200 fails to detect the tracking optical signal transmitted by the first optical system 100 or when the tracking optical signal is positioned away from a central portion of the second tracking-purpose optical signal receiving unit 210 due to the beam path being misaligned even to a small degree, the second optical system 200 performs at least one of a panning operation and a tilt operation through the pan-tilt unit 220 such that the second tracking-purpose optical signal receiving unit 210 is aligned.

When the alignment is maintained as such, wireless optical transmission between the downlink optical receiving unit 208 and the uplink optical receiving unit 108 may be maintained without error.

Meanwhile, the first and second optical systems 100 and 200, the gimbal unit 140, and the pan-tilt unit 220 may include a memory, which stores a program for controlling each component thereof, and a processor which processes data.

Here, the memory collectively refers to a nonvolatile storage device, which keeps stored information even when power is not supplied, and a volatile storage device. For example, the memory may include a NAND flash memory such as a compact flash (CF) card, a secure digital (SD) card, a memory stick, a solid-state drive (SSD), and a micro SD card, a magnetic computer storage device such as a hard disk drive (HDD), and an optical disc drive such as a compact disc read only memory (CD-ROM) and a digital versatile disc (DVD)-ROM.

Hereinafter, a bi-directional wireless optical communication method using the wireless optical communication apparatus 1 in the free space according to an embodiment of the present invention will be described with reference to FIG. 5.

Figure 5:
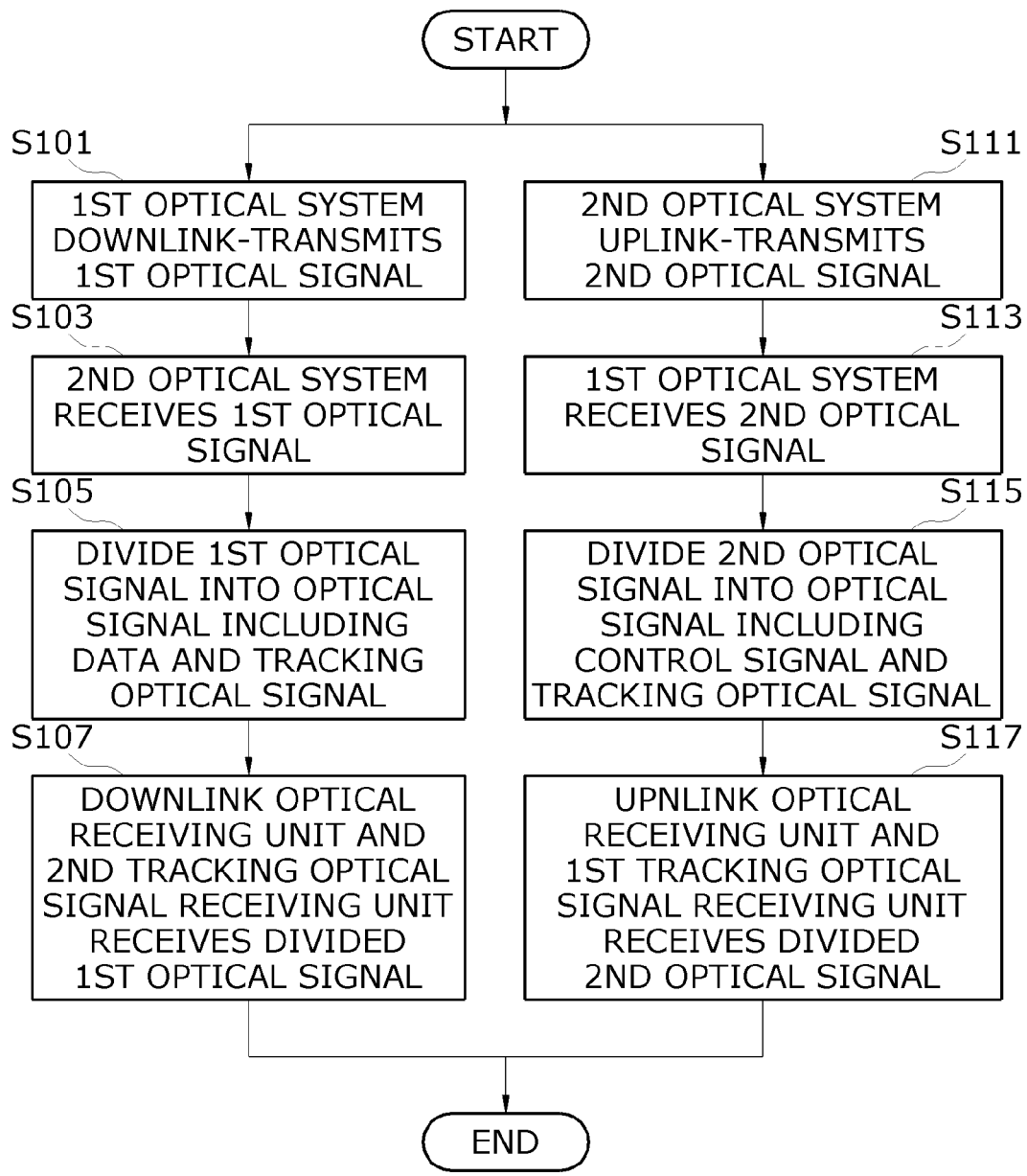
FIG. 5 is a flowchart showing a wireless optical communication method according to an embodiment of the present invention.

FIG. 5 is a flowchart showing a wireless optical communication method according to an embodiment of the present invention.

First, the first optical system 100 may transmit a first optical signal including data and a tracking optical signal for optical alignment through a downlink scheme (S101), or the second optical system 200 may transmit a second optical signal including a control signal and a tracking optical signal for optical alignment through an uplink scheme (S111).

Accordingly, the first optical system 100 receives the second optical signal through the uplink scheme (S113), and the second optical system 200 receives the first optical signal through the downlink scheme (S103).

In this case, each of the first optical system 100 and the second optical system 200 is characterized in transmitting and receiving the first optical signal and the second optical signal through a single port.

Thereafter, the first optical system 100 divides the received second optical signal into an optical signal for a control signal and a tracking optical signal (S115) that are then received by the uplink optical receiving unit 108 and the first tracking-purpose optical signal receiving unit 110, respectively. (S117) The second optical system 200 divides the received first optical signal into an optical signal for data and a tracking optical signal (S105) that are then received by the downlink optical receiving unit 208 and the second tracking-purpose optical signal receiving unit 210, respectively. (S107)

Meanwhile, in the above description, operations S101 to S117 may be further divided into a larger number of sub-operations or combined into a smaller number of operations according to examples of implementation of the present invention. In addition, some of the operations may be omitted or may be executed in the reverse order, as needed. Parts omitted in the description, which have been described above with reference to FIGS. 1 and 4, may be applied to the bi-directional wireless optical communication method shown in FIG. 5.

Figure 6:
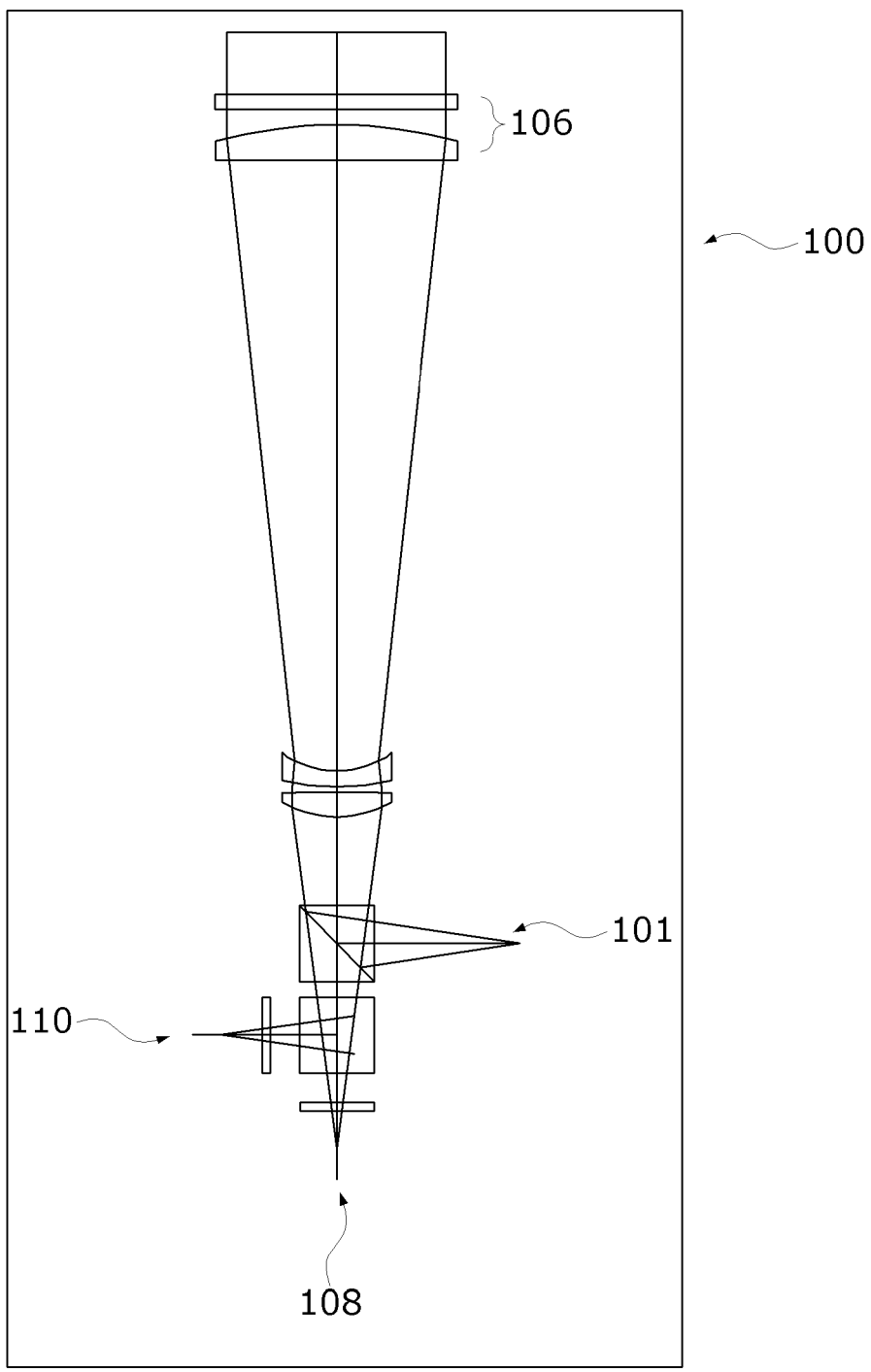
FIG. 6 is a diagram illustrating an example of a transmission/reception lens of the first optical system.
Figure 7:
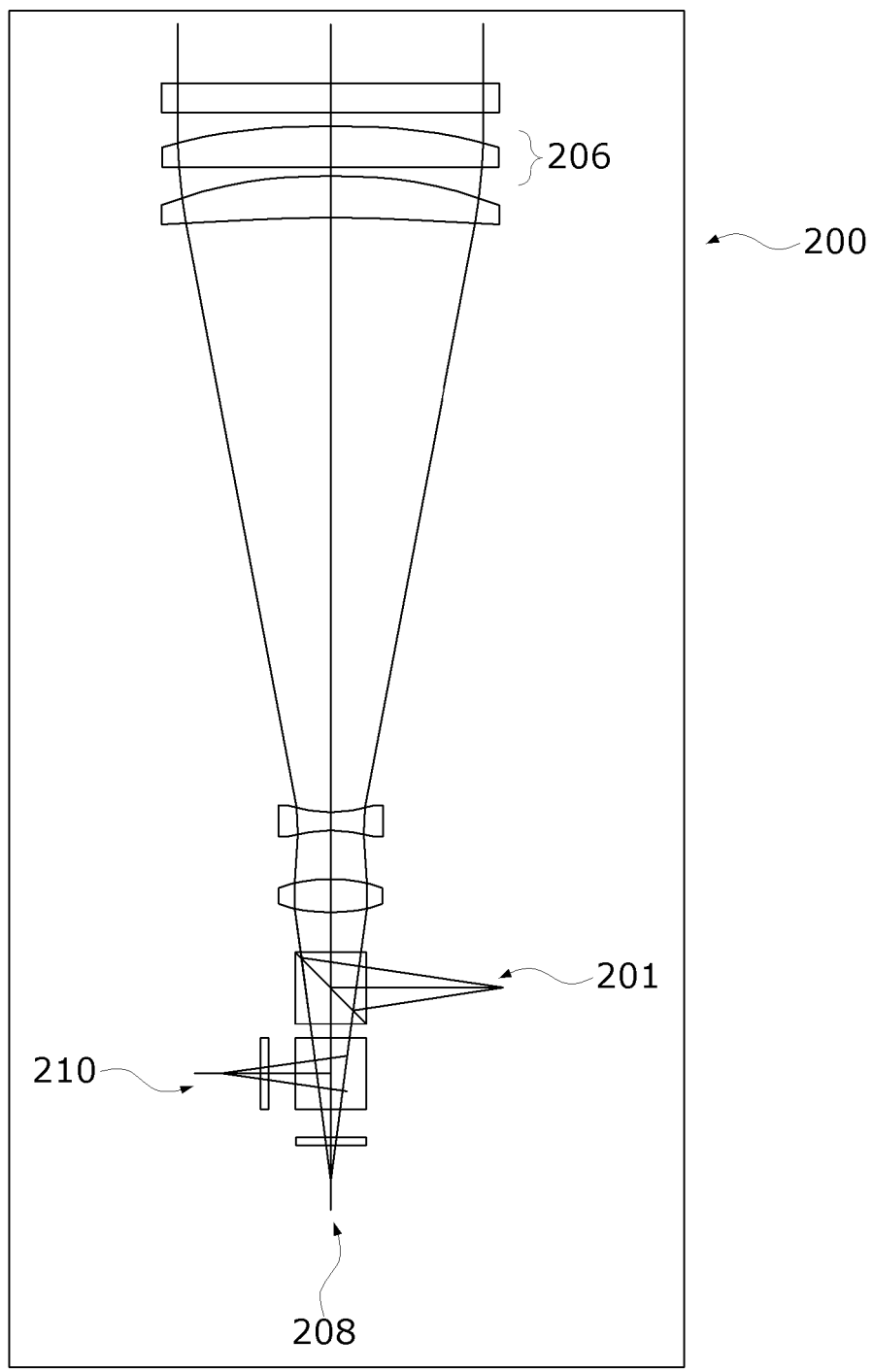
FIG. 7 is a diagram illustrating an example of a transmission/reception lens of the second optical system.

FIG. 6 is a diagram illustrating an example of the transmission/reception lens 106 of the first optical system 100. FIG. 7 is a diagram illustrating an example of the transmission/reception lens 206 of the second optical system 200.

Beams output through the transmission/reception lenses 106 and 206 of the first optical system 100 and the second optical system 200 are designed to be collimated and are designed using a QPD to detect beacon optical signals. In this case, the number of the transmission/reception lenses 106 of the first optical system 100 is designed to be one less than the number of the transmission/reception lenses 206 of the second optical system 200.

As is apparent from the above, the present invention can simultaneously transmit data and a tracking optical signal through a single optical path bi-directionally using a wireless light beam at a time of communication with a mobile object moving in a free space.

The bidirectional wireless optical transmission is performed through a single port in a free space so that the number of components of the system can be reduced.

In addition, the tracking optical signal required for optical alignment with a mobile object shares the same port for data transmission so that the need to provide an additional optical system for tracking can be obviated.

In addition, an XYZ stage is attached to optical transmitting and receiving units such that the optical path is optimized to remove limitations in chromatic aberration correction and alignment so that the optical transmission efficiency can be enhanced.

In addition, the tracking optical signal is also bi-directionally transmitted so that raid tracking can be enabled, and a wireless light beam is used in a free space so that ultrahigh speed wireless optical communication in Gbps or higher can be enabled.

The above description of the invention is for illustrative purposes, and a person having ordinary skills in the art should appreciate that other specific modifications can be easily made without departing from the technical spirit or essential features of the invention. Therefore, the above embodiments should be regarded as illustrative rather than limitative in all aspects. For example, components which have been described as being a single unit can be embodied in a distributed form, whereas components which have been described as being distributed can be embodied in a combined form.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. A wireless optical communication apparatus for performing bi-directional optical transmission in a free space, the wireless optical communication apparatus comprising:
   a first optical system configured to transmit data through a downlink scheme; and
   a second optical system configured to receive the data from the first optical system and transmit a control signal to the first optical system through an uplink scheme,
   wherein each of the first optical system and the second optical system transmits and receives the data and the control signal through a single port,
   wherein the first optical system transmits the data together with a tracking optical signal for optical alignment through the downlink scheme,
   wherein the second optical system comprises a second tracking-purpose optical signal receiving unit configured to receive the tracking optical signal,
   wherein the first optical system converts the data and the tracking optical signal into a single optical signal by a downlink optical transmitting unit and a wavelength division multiplexing (WDM) filter and outputs the single optical signal to a free space; and
   the second optical system divides the data from the tracking optical signal by a WDM filter and a beam splitter, receives the data through a downlink optical receiving unit, and receives the tracking optical signal through the second tracking-purpose optical signal receiving unit,
   wherein the first optical system comprises a first downlink stage to which an optical connector connected to an optical fiber for transferring the optical signal output through the downlink optical transmitting unit is attached and which is configured to adjust a travelling distance of the optical signal by moving in X-axis, Y-axis, and Z-axis directions.

2. The wireless optical communication apparatus of claim 1, wherein the second optical system comprises a second downlink stage to which the downlink optical receiving unit is attached and which is configured to adjust a reception position of the optical signal by moving in X axis, Y-axis, and Z-axis directions.

3. The wireless optical communication apparatus of claim 1, wherein the second optical system transmits the control signal together with a tracking optical signal for optical alignment through the uplink scheme.

4. The wireless optical communication apparatus of claim 3, wherein the first optical system comprises a first tracking-purpose optical signal receiving unit configured to receive the tracking optical signal.

5. The wireless optical communication apparatus of claim 4, wherein the second optical system converts the control signal and the tracking optical signal into a single optical signal by an uplink optical transmitting unit and a WDM filter and outputs the single optical signal to a free space; and
   the first optical system divides the control signal from the tracking optical signal by a WDM filter and a beam splitter, receives the control signal through an uplink optical receiving unit, and receives the tracking optical signal through the first tracking-purpose optical signal receiving unit.

6. The wireless optical communication apparatus of claim 5, wherein the second optical system comprises a first uplink stage to which an optical connector connected to an optical fiber for transferring the optical signal output through the uplink optical transmitting unit is attached and which is configured to adjust a travelling distance of the optical signal by moving in X-axis, Y-axis, and Z-axis directions.

7. The wireless optical communication apparatus of claim 5, wherein the first optical system comprises a second uplink stage to which the uplink optical receiving unit is attached and which is configured to adjust a reception position of the optical signal by moving in X axis, Y-axis, and Z-axis directions.

8. The wireless optical communication apparatus of claim 1, wherein each of the first optical system and the second optical system transmits and receives a tracking optical signal for optical alignment through the single port.

9. The wireless optical communication apparatus of claim 1, wherein the first optical system is attached to a mobile object to transmit and receive the data and the control signal during movement in a free space, and the second optical system is disposed on a ground station to transmit and receive the data and the control signal.

10. The wireless optical communication apparatus of claim 9, wherein the second optical system is attached to a pan-tilt unit such that optical alignment with the first optical system in the free space is continuously maintained through at least one of a panning operation and a tilt operation.

11. The wireless optical communication apparatus of claim 10, wherein the first optical system comprises a first tracking-purpose optical signal receiving unit configured to receive a tracking optical signal for optical alignment through the uplink scheme,
   wherein, when the first tracking-purpose optical signal receiving unit fails to detect the tracking optical signal or the tracking optical signal is positioned away from a central portion of the first tracking-purpose optical signal receiving unit, the first optical system transmits a notification message to the second optical system such that the at least one of the panning operation and the tilt operation is performed.

12. The wireless optical communication apparatus of claim 10, wherein the second optical system comprises a second tracking-purpose optical signal receiving unit configured to receive a tracking optical signal for optical alignment through the downlink scheme,
   wherein, when the second tracking-purpose optical signal receiving unit fails to detect the tracking optical signal or the tracking optical signal is positioned away from a central portion of the second tracking-purpose optical signal receiving unit, the second optical system performs the at least one of the panning operation and the tilt operation through the pan-tilt unit to align the second tracking-purpose optical signal receiving unit.

13. The wireless optical communication apparatus of claim 9, wherein the first optical system is attached to a gimbal unit of the mobile object such that optical alignment with the second optical system in the free space is continuously maintained through at least one of a panning operation and a tilt operation.

14. The wireless optical communication apparatus of claim 13, wherein the second optical system comprises a second tracking-purpose optical signal receiving unit configured to receive a tracking optical signal for optical alignment through the downlink scheme,
   wherein, when the second tracking-purpose optical signal receiving unit fails to detect the tracking optical signal or when the tracking optical signal is positioned away from a central portion of the second tracking-purpose optical signal receiving unit, the second optical system transmits a notification message to the first optical system such that the at least one of the panning operation and the tilt operation is performed.

15. The wireless optical communication apparatus of claim 13, wherein the first optical system comprises a first tracking-purpose optical signal receiving unit configured to receive a tracking optical signal for optical alignment through the uplink scheme,
   wherein, when the first tracking-purpose optical signal receiving unit fails to detect the tracking optical signal or when the tracking optical signal is positioned away from a central portion of the first tracking-purpose optical signal receiving unit, the first optical system performs the at least one of the panning operation and the tilt operation through the gimbal unit to align the first tracking-purpose optical signal receiving unit.

16. A bi-directional wireless optical communication method using a wireless optical communication apparatus in a free space according to claim 1, the bi-directional wireless optical communication method comprising:
   transmitting, by a first optical system, a first optical signal including data and a tracking optical signal for optical alignment through a downlink scheme, or transmitting, by a second optical system, a second optical signal including a control signal and a tracking optical signal for optical alignment through an uplink scheme; and
   receiving, by the first optical system, the second optical signal through the uplink scheme or receiving, by the second optical system, the first optical signal through the downlink scheme,
   wherein each of the first optical system and the second optical system transmits and receives the first optical signal and the second optical signal through a single port, and
   wherein the first optical system is attached to a mobile object and transmits and receives the data and the control signal over a free space, and the second optical system is disposed on a ground station,
   wherein the first optical system transmits the data together with a tracking optical signal for optical alignment through the downlink scheme,
   wherein the second optical system comprises a second tracking-purpose optical signal receiving unit configured to receive the tracking optical signal,
   wherein the first optical system converts the data and the tracking optical signal into a single optical signal by a downlink optical transmitting unit and a wavelength division multiplexing (WDM) filter and outputs the single optical signal to a free space; and
   the second optical system divides the data from the tracking optical signal by a WDM filter and a beam splitter, receives the data through a downlink optical receiving unit, and receives the tracking optical signal through the second tracking-purpose optical signal receiving unit,
   wherein the first optical system comprises a first downlink stage to which an optical connector connected to an optical fiber for transferring the optical signal output through the downlink optical transmitting unit is attached and which is configured to adjust a travelling distance of the optical signal by moving in X-axis, Y-axis, and Z-axis directions.

* * * * *